United States Patent
Griffin (10) Patent No.: US 8,346,308 B2
(45) Date of Patent: Jan. 1, 2013

(54) COMMUNICATION DEVICE

(75) Inventor: Jason T. Griffin, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 679 days.

(21) Appl. No.: 12/206,006

(22) Filed: Sep. 8, 2008

(65) Prior Publication Data
US 2010/0062810 A1  Mar. 11, 2010

(51) Int. Cl.
*H04B 1/38* (2006.01)
*H04M 1/00* (2006.01)
*H04M 9/00* (2006.01)
*G06F 3/02* (2006.01)
*G06F 3/041* (2006.01)
*G09G 5/00* (2006.01)
*G02F 1/1335* (2006.01)

(52) U.S. Cl. .......... 455/566; 455/550.1; 455/556.1; 455/575.3; 345/169; 345/173; 349/114; 379/433.01; 379/433.12

(58) Field of Classification Search .......... 455/90.3, 455/550.1, 556.1, 566, 575.1, 575.3, 575.4; 345/1.1, 3.1, 32, 76, 102, 156, 163, 169, 345/173; 348/14.02, 333.01; 349/113, 114; 361/679.08, 679.09, 679.56, 724, 752, 827; 379/433.01, 433.02, 433.04, 433.12, 433.13; 708/100, 105
See application file for complete search history.

(56) References Cited

U.S. PATENT DOCUMENTS

| | | | | |
|---|---|---|---|---|
| 4,896,370 | A * | 1/1990 | Kasparian et al. | 455/77 |
| 7,146,005 | B1 * | 12/2006 | Anft et al. | 379/433.06 |
| 7,508,411 | B2 * | 3/2009 | Boesen | 348/14.02 |
| 7,768,605 | B2 * | 8/2010 | Polak | 349/114 |
| 7,822,444 | B2 * | 10/2010 | Hamamura et al. | 455/575.1 |
| 2002/0137551 | A1 * | 9/2002 | Toba | 455/566 |
| 2006/0183512 | A1 * | 8/2006 | Segawa et al. | 455/575.1 |
| 2007/0197259 | A1 | 8/2007 | Kota | |
| 2007/0298850 | A1 * | 12/2007 | Miyata et al. | 455/575.3 |

FOREIGN PATENT DOCUMENTS

| | | |
|---|---|---|
| WO | 2006044191 | 4/2006 |
| WO | 2007046380 | 4/2007 |
| WO | 2008000892 | 1/2008 |

OTHER PUBLICATIONS

ASUS P505—The Next Big Thing for PPC Lovers; Jun. 16, 2005, p. 1-3; http://msmobiles.com/news.php/3935.html.

* cited by examiner

*Primary Examiner* — Duc Nguyen
*Assistant Examiner* — Paul P Tran (57) ABSTRACT

A wireless device having a microprocessor for controlling the operation of the device, the device including an upper casing including an interior surface having a primary display and an exterior surface having a secondary display, the primary display being active when the device is in an open configuration and the secondary display being active when the device is in a closed configuration, a lower casing including a keypad, a hinge assembly connecting the upper casing to the lower casing and enabling the device to alternate between the open and closed configurations, and a switch assembly including a switch provided in the upper casing and an actuator provided in the lower casing in alignment with the switch, the switch and actuator configured for engaging each other to perform an action when the upper and lower casings are pressed together.

20 Claims, 6 Drawing Sheets

COMMUNICATION DEVICE

TECHNICAL FIELD

The present disclosure relates generally to mobile communication devices, and more particularly to a system and method of manipulating a display screen on the mobile device.

BACKGROUND

Mobile communication devices may have multiple screens or displays. An example of such devices is a clamshell mobile communication device, which generally has a base and a hinged or sliding lid that can be closed over the base. Such devices generally provide a user with a primary display inside the lid or on the base that is visible when the device is open and provides the user with a user interface. Furthermore, some clamshell devices have a secondary display on the outside of the lid that is visible when the device is closed and provides the user with a secondary user interface. The secondary user interface may provide the user with such information as the device status, or notifications such as missed calls, new messages, and the like.

Some clamshell devices also include input buttons on the outside or sides of the lid for controlling the secondary display. While these buttons can be convenient, since they enable the user to navigate through certain aspects of the secondary display, they can be unintentionally engaged when the device is placed in confined or crowded spaces such as a user's pocket or purse, for example. This can lead to unintentional activation of the secondary display (i.e., the backlight function could be enabled, accidental calls could be placed), which reduces battery life and can also cause security concerns if certain functions are mistakenly accessed.

DETAILED DESCRIPTION

The present disclosure provides a wireless device having a microprocessor for controlling the operation of the device, the device including an upper casing including an interior surface having a primary display and an exterior surface having a secondary display, the primary display being active when the device is in an open configuration and the secondary display being active when the device is in a closed configuration, a lower casing including a keypad, a hinge assembly connecting the upper casing to the lower casing and enabling the device to alternate between the open and closed configurations, and a switch assembly including a switch provided in the upper casing and an actuator provided in the lower casing and in alignment with the switch, the switch and actuator configured for engaging each other to perform and action when the upper and lower casings are pressed together.

A method for navigating through a secondary display of the device is also provided, and includes the steps of activating the display by pressing the upper and lower casings together such that a switch on the upper casing engages an actuator on the lower casing; cycling through each of a plurality of applications visible on the display by pressing the upper and lower casings together; and selecting one of the plurality of applications by engaging a navigation button provided on the device.

Figure 1:
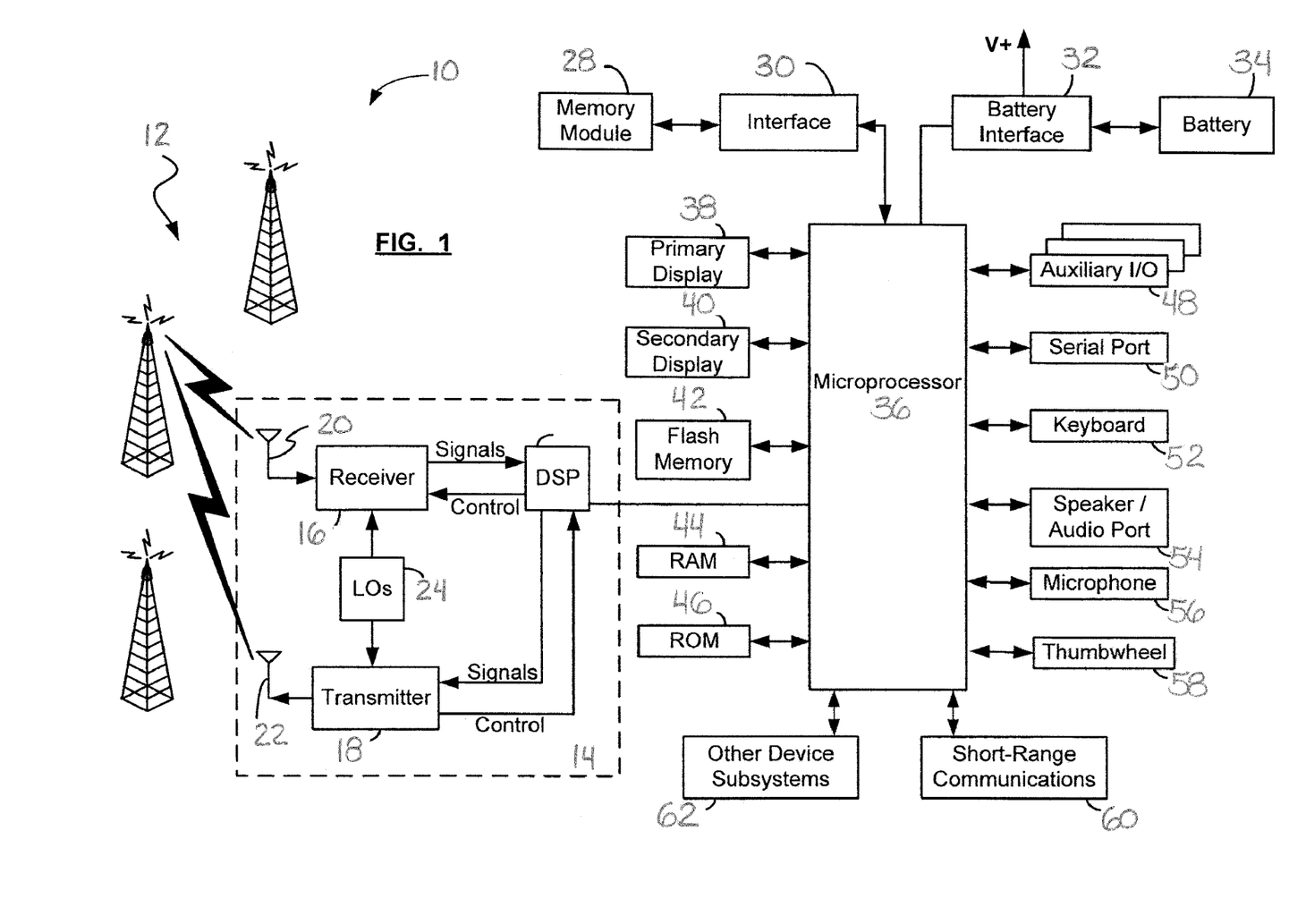
FIG. 1 is a block diagram illustrating a mobile communication device in accordance with the present disclosure.

Reference is first made to FIG. 1, which shows a block diagram illustrating a wireless device 10 suitable for navigating through notifications in accordance with an embodiment of the present disclosure. It will be understood that references to a wireless device in this disclosure may also refer to a wireless device with multiple screens or displays, a clamshell wireless device or to a clamshell mobile communication device. The teachings of this disclosure may be applicable to any wireless device having at least one display, and is not limited to clamshell devices. The wireless device 10 communicates through a wireless communication network 12, which includes antennae, base stations, and supporting radio equipment for supporting wireless communications between the wireless device and other devices connected to wireless network. The wireless network 12 may be coupled to a wireless network gateway and to a wide area network, shown in FIG. 2, and which will be described in further detail below.

In an embodiment, the wireless device 10 is a two-way mobile communication device having at least voice and data communication capabilities, including the capability to communicate with other computer systems. In an embodiment, the wireless device 10 is a clamshell handheld device. Depending on the functionality provided by the wireless device 10, it may be referred to as a data messaging device, a two-way pager, a cellular telephone with data messaging capabilities, a wireless Internet appliance, a data communication device (with or without telephony capabilities), a clamshell device, a slider phone or a flip-phone. The wireless device 10 may communicate with any one of a plurality of fixed transceiver stations within its geographic coverage area.

The wireless device 10 may incorporate a communication subsystem 14, which includes a receiver 16, a transmitter 18, and associated components, such as one or more antenna elements 20 and 22, local oscillators (LOs) 24, and a processing module such as a digital signal processor (DSP) 26. In an embodiment, the antenna elements 20 and 22 may be embedded or internal to the wireless device 10. As will be apparent to those skilled in the field of communications, the particular design of the communication subsystem 14 depends on the wireless network 12 in which the wireless device 10 is intended to operate.

The wireless device 10 may send and receive communication signals over the wireless network 12 after the required network registration or activation procedures have been completed. Signals received by the antenna 20 through the wireless network 12 are input to the receiver 16, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 26. In a similar manner, signals to be transmitted are processed, including modulation and encoding, for example, by the DSP 26. These DSP-processed signals are input to the transmitter 18 for digital-to-analog (D/A) conversion, frequency up conversion, filtering, amplification, and transmission to the wireless network 12 via the antenna 22. The DSP 26 not only processes communication signals, but also provides for receiver and transmitter control. For example, the gains applied to communication signals in the receiver 16 and the transmitter 18 may be adaptively controlled through automatic gain control algorithms implemented in the DSP 26.

Network access is associated with a subscriber or user of the wireless device 10 via a memory module, such as a memory module 28, which may be a Subscriber Identity Module (SIM) card for use in a GSM network or a Universal Subscriber Identity Module (USIM) card for use in a Universal Mobile Telecommunication System (UMTS). The SIM card is inserted in or connected to an interface 30 of the wireless device 10 to operate in conjunction with the wireless network 12. Alternatively, the wireless device 10 may have an integrated identity module for use with systems such as Code Division Multiple Access (CDMA) systems.

The wireless device 10 also includes a battery interface 32 for receiving one or more rechargeable batteries 34. The battery 34 provides electrical power to at least some of the electrical circuitry in the wireless device 10, and the battery interface 32 provides a mechanical and electrical connection for the battery. The battery interface 32 is coupled to a regulator (not shown) which provides power V+ to the circuitry of the wireless device 10.

The wireless device 10 includes a microprocessor 36 which controls the overall operation of the wireless device 10. Communication functions, including at least data and voice communications, are performed through the communication subsystem 14. The microprocessor 36 also interacts with additional device subsystems such as a primary display 38, a secondary display 40, a flash memory 42, a random access memory (RAM) 44, a read-only memory (ROM) 46, auxiliary input/output (I/O) subsystems 48, a data port such as serial port 50, a keyboard or keypad 52, a speaker or audio port 54 for connecting to, for example a set of headphones or an earpiece, a microphone 56, a clickable thumbwheel or thumbwheel 58, a short-range communications subsystem 60, and any other device subsystems generally designated as 62. Some of the subsystems shown in FIG. 1 perform communication-related functions, whereas other subsystems may provide "resident" or on-device functions. Notably, some subsystems, such as the keypad 52, the primary display 38, the secondary display 40, and the clickable thumbwheel 58, for example, may be used for both communication-related functions, such as displaying notifications or entering a text message for transmission over the wireless network 12, and executing device-resident functions such as a clock, a calculator or a task list. Operating system software used by the microprocessor 36 is preferably stored in a persistent store such as the flash memory 42, which may alternatively be the ROM 46 or similar storage element. Those skilled in the art will appreciate that the operating system, specific device applications, or parts thereof, may be temporarily loaded into a volatile store such as the RAM 44.

The microprocessor 36, in addition to its operating system functions, enables execution of software applications on the wireless device 10. A predetermined set of applications that control basic device operations, including data and voice communication applications, will normally be installed on the wireless device 10 during or after manufacture. The wireless device 10 may include a personal information manager (PIM) application having the ability to organize and manage data items relating to a user such as, but not limited to, instant messaging, email, calendar events, voice mails, appointments, and task items. One or more memory stores may be available on the wireless device 10 to facilitate storage of information, such as the flash memory 42, the RAM 44, the ROM 46, the memory module 28, or other types of memory storage devices or FLASH memory cards represented by the other device subsystems 62, such as Secure Digital (SD) cards or mini SD cards, etc.

The PIM and/or media applications have the ability to send and receive data items via either the wireless network 12 or a link to a computer system. The link to the computer system may be via the serial port 50 or the short-range communications subsystem 60. In an embodiment, PIM and/or media data items are seamlessly combined, synchronized, and updated via the wireless network 12, with the wireless device user's corresponding data items stored and/or associated with a host computer system, thereby creating a mirrored or partially mirrored host computer on the wireless device 10 with respect to such items. This may be advantageous where the host computer system is the wireless device user's office computer system. Additional applications may also be loaded onto the wireless device 10 through the wireless network 12, the auxiliary I/O subsystem 48, the serial port 50, the short-range communications subsystem 60, or any other suitable subsystem 62, and installed by a user in the RAM 44 or a non-volatile store such as the ROM 46 for execution by the microprocessor 36. Such flexibility in application installation increases the functionality of the wireless device 10 and may provide enhanced on-device functions, communication-related functions, or both. For example, secure communication applications may enable electronic commerce functions and other such financial transactions to be performed using the wireless device 10.

In a data communication mode, a received data signal representing information such as a text message, an email message, a media file to be transferred, or Web page download will be processed by the communication subsystem 14 and input to the microprocessor 36, which will further process the signal for output to the primary display 38, secondary display 40, or alternatively to the auxiliary I/O device 48. A user of the wireless device 10 may also compose data items, such as email messages, for example, using the keypad 52 and/or the clickable thumbwheel 58 in conjunction with the primary display 38 and possibly the auxiliary I/O device 48. The keypad 52 may be one of a complete alphanumeric keypad, a reduced alphanumeric keypad or a telephone-type keypad. These composed items may be transmitted through the communication subsystem 14 over the wireless network 12 or via the short range communication subsystem 60.

For voice communications, the overall operation of the wireless device 10 is similar, except that the received signals would be output to the speaker or audio port 54 and signals for transmission would be generated by a transducer such as the microphone 56. Alternative voice or audio I/O subsystems, such as a voice message recording subsystem, may also be implemented on the wireless device 10. Although voice or audio signal output is typically accomplished primarily through the speaker or audio port 54, the primary display 38 or the secondary display 40 may also be used to provide an indication of the identity of a calling party, duration of a voice call, or other voice call related information. Stereo headphones or an earpiece may also be used in place of the speaker 54.

The serial port 50 is normally implemented in a personal digital assistant (PDA) type communication device for which synchronization with a user's computer is a desirable, albeit optional, component. The serial port 50 enables a user to set preferences through an external device or software application and extends the capabilities of the wireless device 10 by providing for information or software downloads to the wireless device 10 other than through the wireless network 12. The alternate download path may, for example, be used to load software or data files onto the wireless device 10 through a direct, reliable and trusted connection.

The short-range communications subsystem 60 is an additional optional component which provides for communication between the wireless device 10 and different systems or devices, which need not necessarily be similar devices. For example, the subsystem 60 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 60 may be a wireless networking communications subsystem, conforming to IEEE 802.11 standards such as one or more of 802.11b, 802.11g, or 802.11n.

Figure 2:
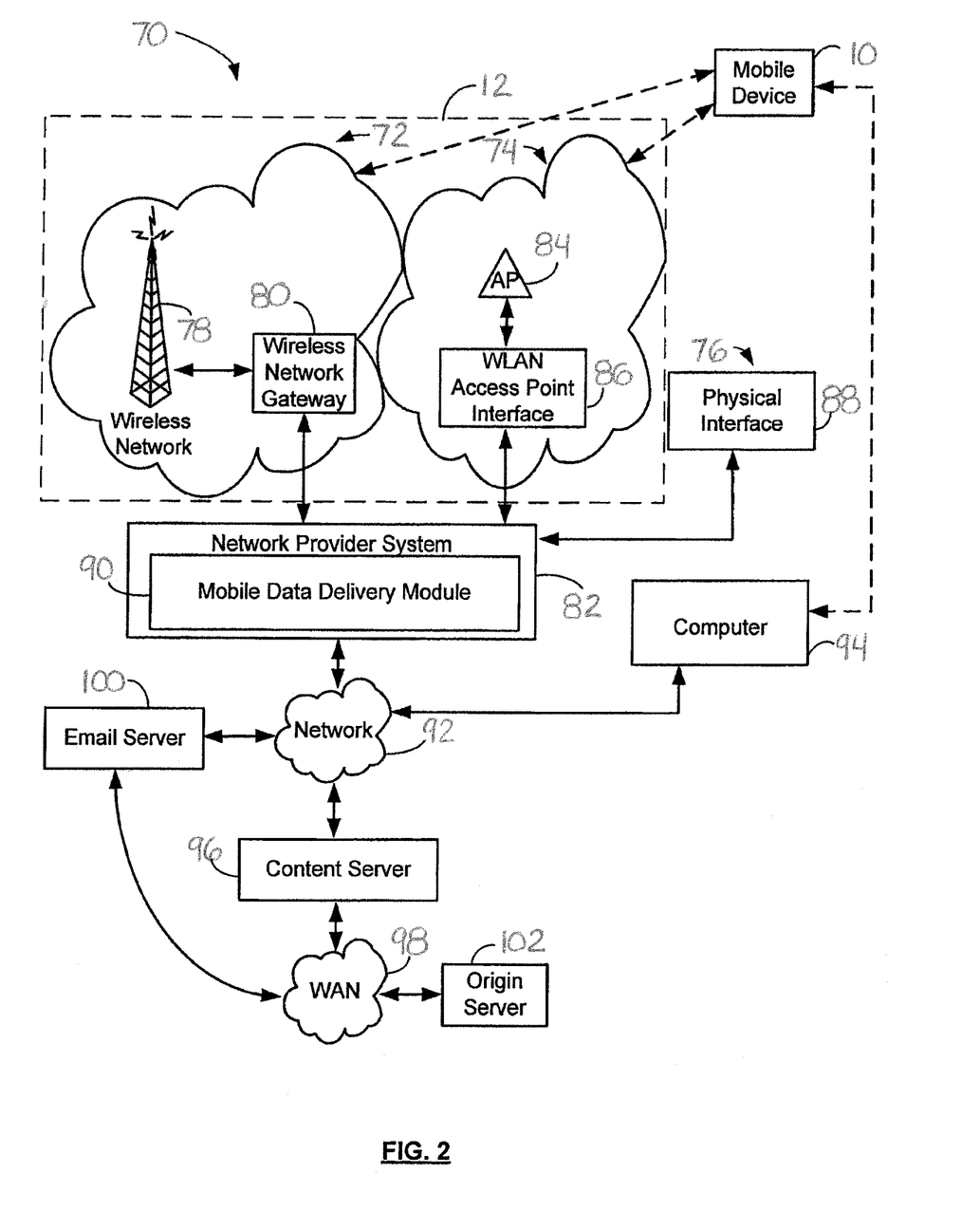
FIG. 2 is a block diagram illustrating a communication system suitable for use with the mobile communication device.

Reference is next made to FIG. 2, which shows a communication system 70 suitable for use with the wireless device 10 shown in FIG. 1. The communication system 70 generally includes one or more wireless devices 10 (only one of which is shown in FIG. 2) and the wireless network 12. The wireless network 12 may include a wireless Wide Area Network (WAN) 72, a Wireless Local Area Network (WLAN) 74, and/or other interfaces 76 (which may not necessarily be wireless).

Referring to FIG. 2, the wireless WAN 72 may be implemented as a packet-based cellular or mobile network that includes a number of base stations 208 (one of which is shown in FIG. 2), each of which provides wireless Radio Frequency (RF) coverage to a corresponding area or cell. The wireless WAN 72 is typically operated by a cellular network service provider that sells subscription packages to users of the wireless devices 10. The wireless WAN 72 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), or Evolution-Data Optimized (EV-DO).

As shown in FIG. 2, the communications system 70 also includes a wireless network gateway 80 and one or more network provider systems 82. The wireless network gateway 80 provides translation and routing services between the network provider system(s) 82 and the WAN 72, which facilitates communication between the wireless devices 10 and other devices (not shown) connected, directly or indirectly, to the network provider system 82.

The WLAN 74 comprises a network which in some examples conforms to IEEE 802.11 standards such as one or more of 802.11b, 802.11g, or 802.11n; however, other communications protocols may also be used for the WLAN 74. The WLAN 74 includes one or more wireless RF Access Points (AP) 84 (one of which is shown in FIG. 2) that collectively provide a WLAN coverage area. For the embodiment depicted in FIG. 2, the WLAN 74 is operated by an enterprise (for example, a business or university in a building or campus type environment) and the access points 84 are connected to an access point (AP) interface 86, which provides translation and routing services between the access points and the network provider system 82 to facilitate communication between two or more of the wireless devices 10 and other devices (e.g., such as desktop computers) connected, directly or indirectly, to the network provider system. The AP interface 86 is implemented using a computer, for example, a server running a suitable computer program or software.

According to an embodiment, the other interfaces 76 may be implemented using a physical interface 88, which includes an Ethernet, Universal Serial Bus (USB), Firewire, or infrared (IR) connection implemented to exchange information between the network provider system 82 and the wireless device 10.

The network provider system 82 comprises a server or server modules or a number of servers or server modules which are typically located behind a firewall (not shown). The network provider system 82 may include a number of modules including a mobile data delivery module 90. Various modules running on the network provider system 82 may be implemented as a number of services running on a single server or as a number of interconnected servers each running a software program to implement the functionality of the respective module. The network provider system 82 provides access for the wireless devices 10, through either the wireless WAN 72, the WLAN 74, or the other connection 76 to the devices connected, for example, through an enterprise network 92 (e.g., an intranet), to the network provider system 82. In an embodiment, the data delivery module 90 is implemented on a computer, such as the network provider system 82.

The enterprise network 92 comprises a local area network, an intranet, the Internet, a direct connection, or combinations thereof, and may comprise an intranet for a corporation or other type of organization. In at least some embodiments, the network provider system 82 is part of the enterprise network 92, is located behind a corporate firewall and is connected to the wireless network gateway 80 through the Internet. A computer 94 (e.g., a desktop or laptop computer) belonging to the user of the wireless device 10 is typically connected to the enterprise network 92. As described earlier, the wireless device 10 can be temporarily and directly connected to the computer 94 using, for example, the serial port 50. Alternatively, the wireless device 10 may communicate with the computer 94 using the communication subsystem 14 and the WAN 72 and/or the short-range communications subsystem 60 and the WLAN 74.

As shown in FIG. 2, an application/content server 96 may be connected to the enterprise network 92 and also to another network, for example a Wide Area Network (WAN) 98. In some embodiments, an email server 100 and/or the content server 96 form part of the enterprise network 92. The WAN 98 may further connect to other networks and may comprise or be configured with the Internet, a direct connection, an LAN, a wireless communication link, or any combination thereof. Content providers, such as Web servers, may be connected to the WAN 98, an example of which is shown in FIG. 2 as an origin server 102.

According to an embodiment, the mobile data delivery module 90 provides connectivity between the wireless WAN 72 and the WLAN 74 and the other connection 76 and devices and/or networks connected directly or indirectly to the network provider system 82. In an embodiment, the connectivity provided may be Hypertext Transfer Protocol (HTTP) based connectivity providing an Internet based service connection to devices connected to the wireless WAN 72, the WLAN 74, or the other connection 76 and devices and/or networks connected directly or indirectly to the network provider system 82. The network 92, the application/content server 96, the WAN 98, and the origin server 102, are individually and/or collectively in various combinations a content source for the network provider system 82. It will be appreciated that the system shown in FIG. 2 comprises but one possible communication network or configuration of a multitude of possible configurations for use with the wireless devices 10.

Figure 3:
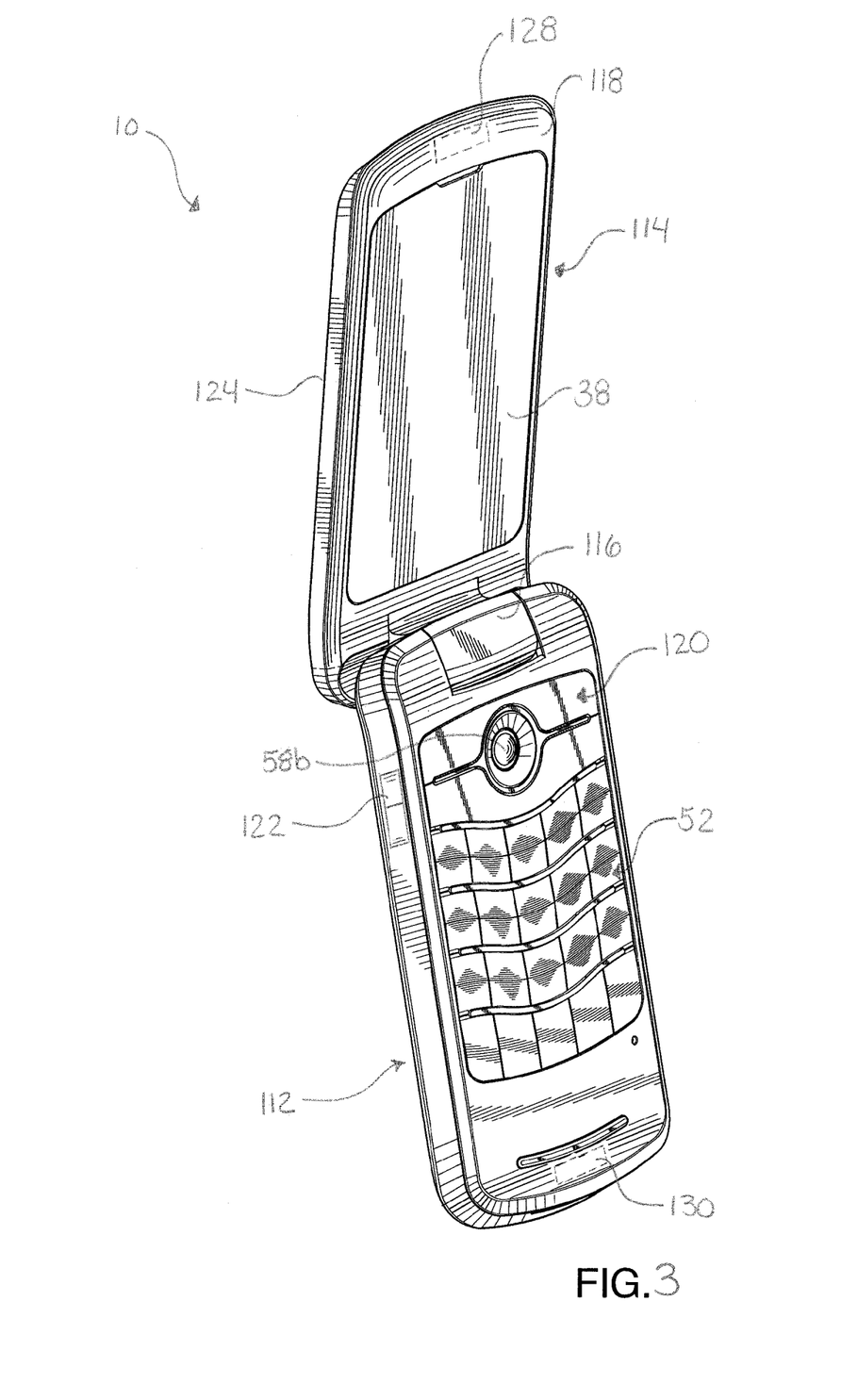
FIG. 3 is a front perspective view of the mobile communication device in a closed orientation.
Figure 4:
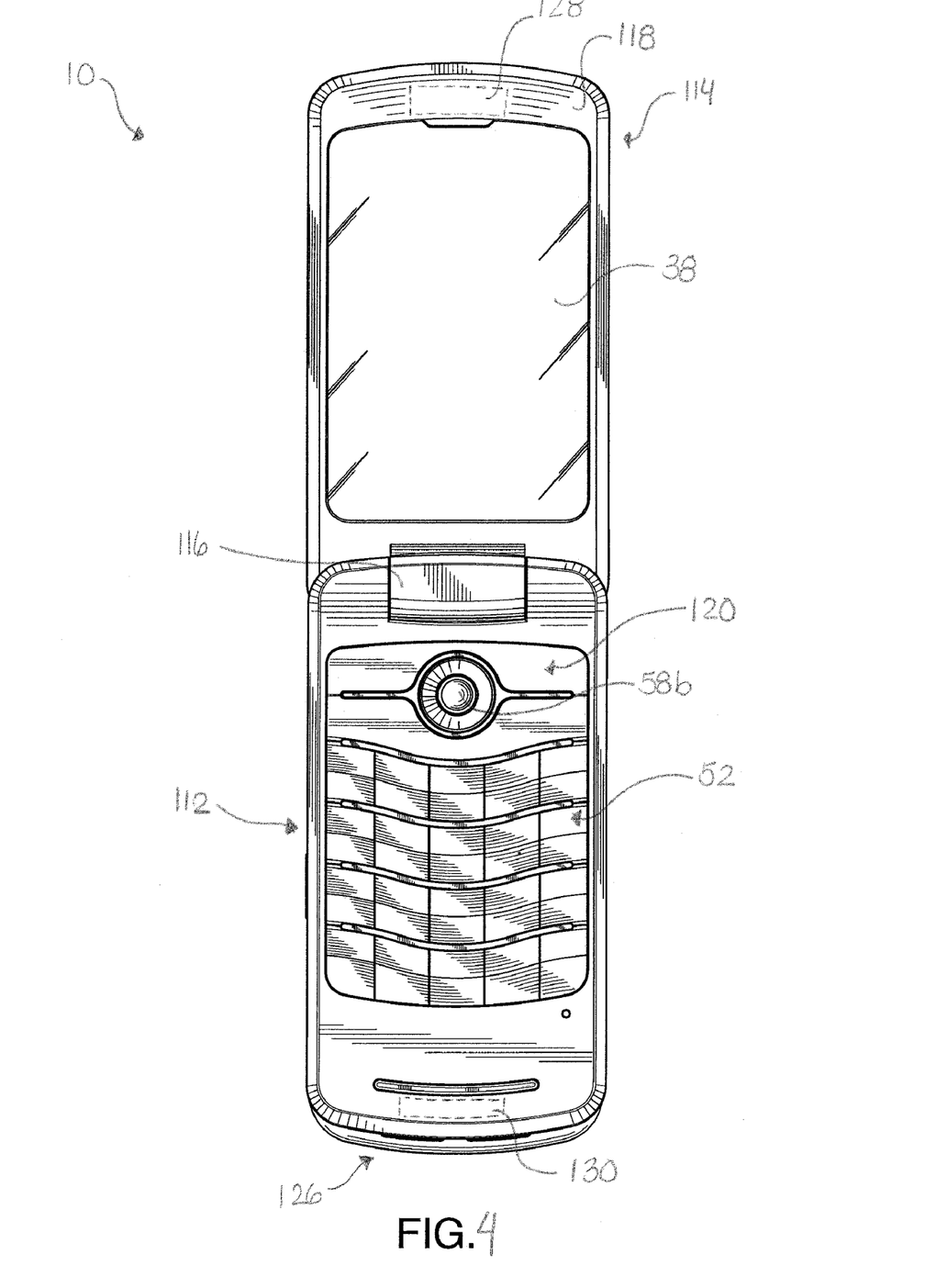
FIG. 4 is a front perspective view of the mobile communication device in an open orientation.
Figure 5:
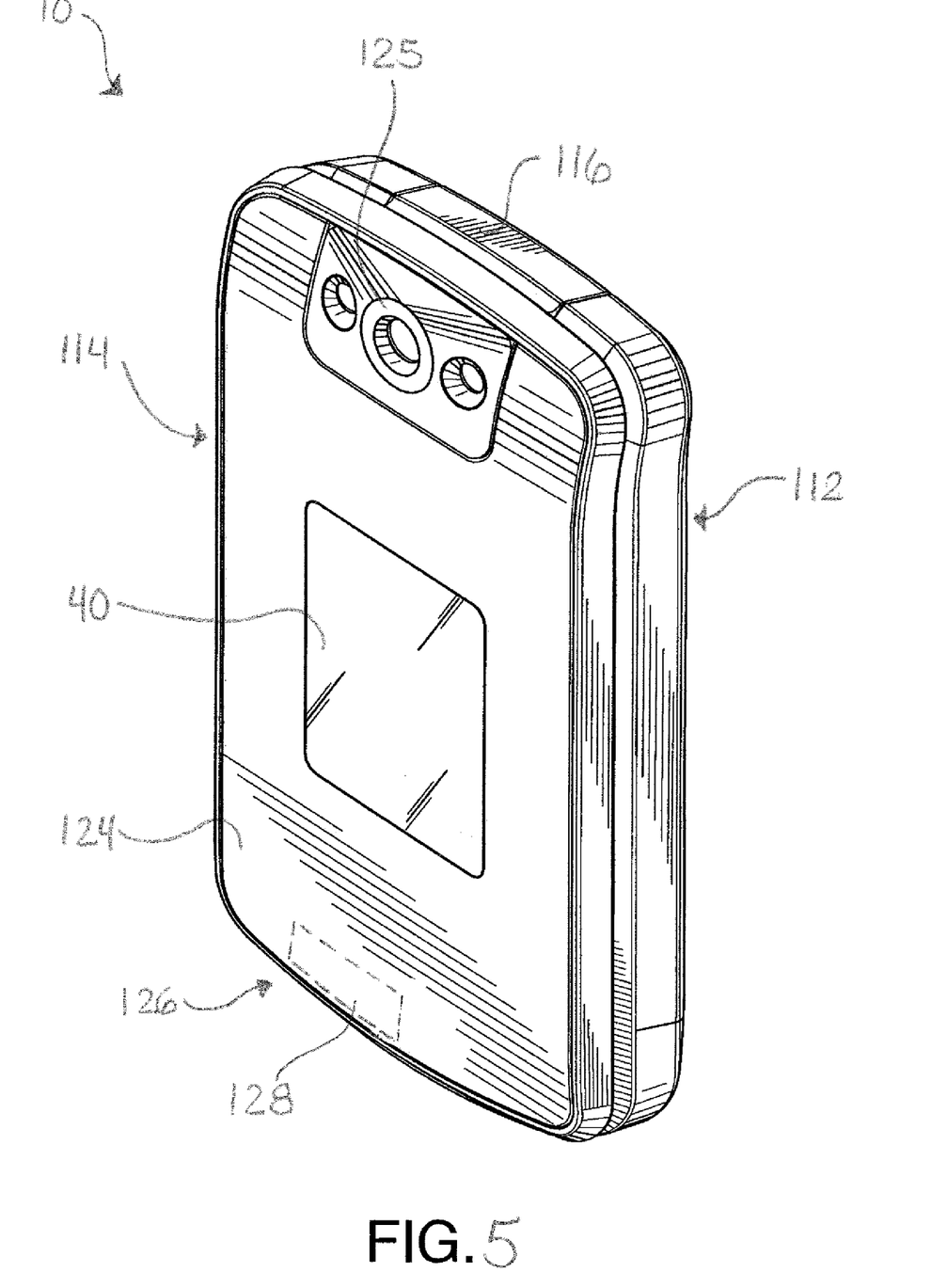
FIG. 5 is a front view of the mobile communication device in the open orientation.
Figure 6:
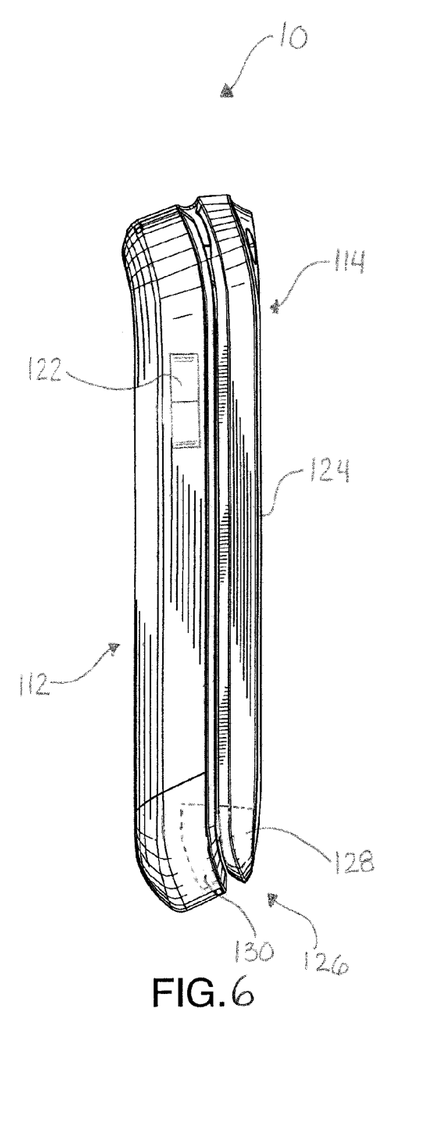
FIG. 6 is a side view of the mobile communication device in the closed orientation.
Figure 7:
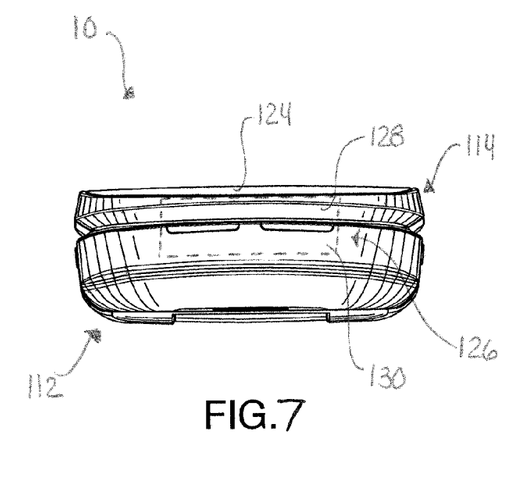
FIG. 7 is a bottom view of the mobile communication device in the closed orientation.

Reference is next made to FIGS. 3-7, which show an embodiment of the wireless device 10 in an open (FIGS. 3-4) and a closed (FIGS. 5-7) configuration. In the shown embodiment, the wireless device 10 is a clamshell mobile communication device. As mentioned above, the wireless device 10 may be a data and voice-enabled handheld device. The wireless device 10 includes the primary display 38 that is visible when the wireless device 10 is in the opened configuration (FIGS. 3-4), and the secondary display 40 that is visible when the wireless device 10 is in the closed configuration (FIGS. 5-7). The term visible as used above is meant to say that the display may be viewable by the user looking at the front of the wireless device 10; however, the display may or may not be active or displaying a graphical user interface or GUI thereon (not shown) even when the display is not visible to the user. The primary display 38 may be off when the wireless device 10 is in the closed configuration to save battery power. Similarly, the secondary display 40 may be off when the wireless device 10 is in the opened configuration to save battery power, or the secondary display may show a default image such as a background or a clock when the wireless device 10 is in the open configuration.

A front view of the wireless device 10 in the open configuration is shown in FIGS. 3 and 4. The wireless device 10 includes a lower casing 112 attached to an upper casing 114 by a hinge assembly 116, as known in the art. Preferably, an interior surface 118 of the upper casing 114 includes the primary display 38, which displays a primary GUI, although it is appreciated that the primary display may be located on the lower casing 112. The lower casing 112 preferably includes, among other things, the keypad 52, the clickable thumbwheel 58 (not shown) or other device for navigation such as a trackball 58*b* and one or more input buttons 120, such as select, cancel, and/or talk buttons. Further and as seen in FIG. 6, the lower casing 112 may include a pair of side navigation buttons 122 configured for navigating through the secondary display 40 when the device is in the closed configuration, which will be described in further detail below. Although the navigation buttons 122 may be used as a navigation tool for the secondary display 40 when the wireless device 10 is in the closed configuration, they may provide other functions, for example volume or camera control, when the wireless device 10 is in the open configuration. These other functions for the navigation buttons 122 may be disabled when the wireless device 10 is in the closed configuration, to prevent unintentional activity. However, it is appreciated that the navigation buttons 122 are not limited to this location, and may be located on the upper casing 114, for example.

As shown in FIG. 5, the front view of the closed wireless device 10 includes an exterior surface 124 of the upper casing 114, having the secondary display 40. The exterior surface 124 may also include secondary navigation tools such as a selection button or a secondary trackball (not shown), and a camera lens 125. The secondary display 40 displays a secondary GUI, which may include status information such as a battery status, and one or more event notifications, such as a "new email" or "missed call" notification.

Internally, the wireless device 10 includes one or more circuit boards (not shown), the microprocessor 36 (FIG. 1), a memory (not shown), the battery 34 (FIG. 1), the antennae 20, 22 (FIG. 1), etc., which may all be coupled to the input buttons 120, the keypad 52, the primary display 38, the secondary display 40, the trackball 58*b*, etc., as known in the art. The microprocessor 36 is typically coupled to one or more input devices (e.g., the navigation buttons 122, the keypad 52, the trackball 58*b*) for receiving user commands, selections or queries, and the primary display 38 and the secondary display 40 for displaying the results of these commands or queries. For example, user queries may be transformed into a combination of commands for producing one or more tables of output data which may be incorporated in one or more display pages for presentation to the user. In another example, user selections may be transformed into a command for displaying a preview of the selection on the primary display 38 or the secondary display 40. The microprocessor 36 is also coupled to the memory (not shown).

Although the wireless device 10 is shown as having separate screens for the primary display 38 and the secondary display 40, it should be understood that a single screen may provide for both the primary display 38 and the secondary display 40. For example, the upper casing 114 may have an opening or a transparent portion through which a screen on the lower casing 112 is visible when the wireless device 10 is in the closed configuration. Such a screen may show the primary display 38 when the wireless device 10 is open, and may change to show the secondary display 40 when the wireless device 10 is closed. Other such variations would be possible. For example, in a slider phone, a single display is utilized, regardless of whether the phone is in the open or closed configuration.

A user may interact with the wireless device 10 and its software modules using the GUI, which may include the secondary GUI. The GUI is controlled by an operating system (not shown) and provides a display format providing information to the user, or enabling the user to choose commands, execute application programs, manage computer files, and perform other functions by selecting pictorial representations (i.e., icons), or selecting items from a menu through the use of an input or pointing device such as the trackball 58*b* or the keypad 52. Generally, the GUI is used to convey information and receive commands from users and includes a variety of GUI objects or controls including icons, toolbars, drop-down menus, pop-up menus, text, dialog boxes, buttons, etc. A user typically interacts with the GUI presented on the primary display 38 by using an input or pointing device to position a pointer or cursor (not shown) over an object (i.e., "pointing" at the object) and by "clicking" on the object (e.g., by depressing the trackball 58*b* or a button on the keyboard 52, etc.). This is often referred to as a point-and-click or selection operation. Typically, the object may be highlighted (e.g., shaded) when it is selected or pointed at by the pointer or cursor to indicate that the object is selectable.

Typically, a GUI-based system presents application, status, and other information to the user on the primary display 38 and the secondary display 40. The GUI may provide for a full user interface whereas the secondary GUI may provide a condensed or simplified user interface, described in further detail below. For example, the GUI may provide a window (not shown), as known in the art, which is a display area shown within the primary display 38, typically rectangular, in which a user may view an application or document. The window may be open, closed, displayed full screen, reduced to an icon, increased or reduced in size, or moved to different areas of the primary display 38. Multiple windows may be displayed simultaneously. For example, the windows may be displayed within other windows, overlapped with other windows, or tiled within the display area.

In conventional clamshell devices, the secondary GUI generally includes a simplified user interface that provides status (i.e., current time, battery status) or event notifications (i.e., new message, missed call) to the user. Such a simplified user interface on the secondary display is configured for preventing unintentional activation of the device 10 in the closed configuration. However, in some cases, it may be convenient for the user to navigate through the secondary display 40 to access certain applications while the device 10 is in the closed configuration. To address this issue, some conventional clamshell devices include external buttons on the exterior surface of the upper casing. However, accidental engagement of these buttons (i.e., such as when the device 10 is placed into a confined area, like a user's pocket) can reduce battery life, cause security concerns and can also cause applications to be unintentionally accessed.

Accordingly, and as seen in FIGS. 3-7, the present device 10 includes a switch assembly 126 configured for enabling user navigation of the secondary GUI on the secondary display 40. More specifically, the switch assembly 126 includes a switch 128 provided on the upper casing 114 configured for engaging an actuator 130 provided on the lower casing 112, such that upon engagement, the user can navigate through various menu items or applications available on the secondary display 40. It is appreciated that the switching assembly 126 could also be configured such that the actuator 130 is on the upper casing 114 and the switch 128 is provided on the lower casing 112. Preferably, the switch and actuator 128, 130 are in alignment with each other to enable successful engagement. The switch and actuator 128, 130 are preferably arranged flush with their respective casings 112, 114, such that they do not interfere with the keypad 52 or primary display 38. However, it is appreciated that the switch and actuator 128, 130 could also be arranged such that one of the switch and actuator is sub-flush within the respective casing, and the other of the switch and actuator protrudes from the respective casing, like a button. Alternatively, the switching assembly 126 could include a button provided on the upper casing 114 arranged in alignment with one or more of the keys on the keypad 52 (not shown), such that upon engagement of the button and the respective key, the user is able to navigate on the secondary display 40. However, it is appreciated that the switching assembly 126 is not limited to those described above, and that alternative assemblies may be appropriate, to suit the application. For example, the switching assembly 126 may include either mechanical, optical or magnetic switches, or the like.

The switch assembly 126 is configured for operation when the device 10 is in the closed configuration. Specifically, when the device 10 is in the closed configuration, the user can press or "squeeze" the lower and upper casings 112, 114 together at the location of the switch assembly 126, actuating the switch assembly 126 such that the switch 128 and actuator 130 are engaged, and activating the secondary GUI. Upon activation, the secondary display 40 will "awaken" (i.e., the backlight is activated, the device is unlocked, etc.), enabling the user to navigate through the secondary GUI. For example, after the initial "squeeze", the user can continue to "squeeze" the mobile device 10 until the desired application is reached—in other words, each time the user "squeezes" the device, the secondary GUI cycles through corresponding applications (i.e., email messages, call log, volume options, clock options, etc.). When the user reaches the desired application, the navigation buttons 122 (which were unlocked upon the awakening of the secondary display 40) can be utilized to scroll through and further navigate the specific application. It is contemplated that the applications available on the secondary GUI can be configured by the user to suit their particular needs, or by an IT policy to suit particular security concerns. It is further contemplated that either a visual feedback or audible alert may be provided when the assembly 126 is actuated.

A specific example utilizing the above-described switch assembly 126 will now be described. The user receives a notification on the secondary display 40 that a new email message has arrived. As known in the art, this notification can be an icon symbolizing a new message, or written notification that a new message has been received (i.e., "1 new message"). Rather than opening up the device 10, the user wants to know who sent the email message, to determine whether to respond to the sender by return email or by phone. Accordingly, the user "squeezes" the lower and upper casings 112, 114 together, engaging the switch 128 and actuator 130, enabling an action to be performed. For example, upon actuation of the switch assembly 126, the secondary display awakes (i.e., the backlight is activated), displaying the clock application. The user continues to squeeze the device 10, each squeeze corresponding to a different application (i.e., clock, volume, call log, email inbox), until the email inbox application is reached. At this point, the user can engage the navigation buttons 122 to select the email inbox, and the secondary GUI will then display the user's inbox on the secondary display 40. The user can then utilize a combination of the switch assembly 126 and the navigation buttons 122 to select the new email message and determine the sender of the message. If the user decides to reply to the message, they can open the device 10, causing the secondary GUI to revert back to its default display (i.e., the clock application, for example) and locking the secondary display 40, such that the GUI of the primary display 38 can be utilized to compose and send a reply message.

The above is meant for example only, and it is to be understood that the present switch assembly 126 is not limited to the above description. For example, the user can utilize the present switch assembly 126 to modify the volume of incoming calls, scroll through call logs to determine missed calls, change the ring tone (i.e., vibrate, silent, etc.), change the time of the clock application, and the like. Further, the switch assembly 126 can be configured such that if the user squeezes the device 10 for a predetermined amount of time, the device will enter into sleep mode. Such a function is configured for preventing unintentional activation of the secondary GUI, for example when the device 10 is placed into a user's pocket, and can either be configured by the user or by IT Policy.

It is contemplated that the present switch assembly 126 enables the user to easily navigate through the secondary GUI, without the need to open the mobile device 10 or to locate/manipulate buttons on the exterior surface 124 of the upper casing 114. Rather, the present switch assembly 126 effectively turns the entire mobile device 10 into a "switch", providing efficient manipulation of the secondary display 40. It is further contemplated that the present switch assembly 126 addresses the security concerns that are typical in clamshell mobile devices.

It is further contemplated that the switch assembly 126 may be used to input a password to unlock a secure device. For example, the user may enter a sequence of 1 short tap (or squeeze), 3 long taps and 1 short tap as the password sequence to unlock the device 10.

While a particular embodiment of the present mobile communication device has been described herein, it will be appreciated by those skilled in the art that changes and modifications may be made thereto without departing from the disclosure in its broadest aspects and as set forth in the following claims.

The invention claimed is:

1. A wireless device having a microprocessor for controlling the operation of the device, the device comprising:
an upper casing including an interior surface having a primary display and an exterior surface having a secondary display, said primary display being active when the device is in an open configuration and said secondary display being active when the device is activated by a switch assembly in a closed configuration;
a lower casing including an interior surface having a keypad;
a hinge assembly connecting said upper casing to said lower casing and enabling said device to alternate between said open configuration and said closed configurations;
wherein the switch assembly includes a switch provided in the interior surface of said upper casing at an end distal from said hinge assembly, and an actuator provided in the interior surface of said lower casing at an end distal from said hinge assembly and in alignment with said switch; said switch configured for engaging said actuator to perform an action including generating a tap sequence with a different length as password to activate said secondary display, wherein said tap sequence is created by squeezing said upper and lower casings together at their respective exterior surfaces at the switch assembly after the device has been transitioned to the closed configuration.

2. The wireless device of claim 1 wherein said mobile device is one of a clamshell device and a slider device.

3. The wireless device of claim 1 wherein said secondary display provides feedback confirming performance of said action.

4. The wireless device of claim 3 wherein said feedback is one of a tactile feedback and an audible feedback.

5. The wireless device of claim 1 further including at least one navigation button provided on a sidewall of said lower casing, said navigation buttons configured for actuation.

6. The wireless device of claim 1 wherein said switch protrudes from said interior surface of said upper casing, and wherein said actuator is arranged flush with said lower casing.

7. The wireless device of claim 1 wherein said switch is arranged flush with said upper casing and wherein said actuator protrudes from said interior surface of said lower casing.

8. The wireless device of claim 1 wherein said switch is arranged flush with said upper casing and wherein said actuator is a key on said keypad.

9. The wireless device of claim 1 wherein upon squeezing engagement of said switch and said actuator for a predetermined period of time, said mobile device is locked.

10. The wireless device of claim 1 wherein when said device is in said open configuration, said switching assembly is deactivated.

11. A wireless device having a microprocessor for controlling the operation of the device, the device comprising:
an upper casing including an interior surface having a primary display and an exterior surface having a secondary display, said primary display being active when the device is in an open configuration and said secondary display being active when the device is activated by a switch assembly in a closed configuration;
a lower casing including an interior surface having a keypad;
a hinge assembly connecting said upper casing to said lower casing and enabling said device to alternate between said open configuration and said closed configurations;
wherein the switch assembly including a switch provided in the interior surface of said upper casing at an end distal from said hinge assembly, and an actuator provided in the interior surface of said lower casing at an end distal from said hinge assembly and in alignment with said switch;
said switch configured for engaging said actuator to perform an action including generating a tap sequence to navigate through a plurality of applications on a secondary graphical user interface of said secondary display, wherein said tap sequence is created by successively squeezing said upper and lower casings together at their respective exterior surfaces at said switch assembly after the device has been transitioned to the closed configuration; wherein upon each successive squeeze of said switch and said actuator, one of said plurality of applications is displayed on the secondary graphical user interface;
at least one navigation button provided on a sidewall of said lower casing, said navigation button configured for enabling selection of one of said plurality of applications on said secondary graphical user interface.

12. The wireless device of claim 11 wherein said switch protrudes from said interior surface of said upper casing, and wherein said actuator is arranged flush with said lower casing.

13. The wireless device of claim 11 wherein said switch is arranged flush with said upper casing and wherein said actuator protrudes from said interior surface of said lower casing.

14. The wireless device of claim 11 wherein said switch is arranged flush with said upper casing and wherein said actuator is a key on said keypad.

15. The wireless device of claim 11 wherein upon engagement of said switch and said actuator for a predetermined period of time, said mobile device is locked.

16. The wireless device of claim 11 wherein when said device is in said open configuration, said switching assembly is deactivated.

17. A method for enabling navigation through a plurality of applications on a mobile device in a closed configuration, the mobile device including an upper casing having an exterior surface and a lower casing having an exterior surface, an external display provided on the exterior surface of said upper casing and a switch assembly provided on respective interior surfaces of said upper and lower casings, the upper and lower casings being connected by a hinge assembly, the method including:
squeezing said upper and lower casings together at their respective exterior surfaces at the switch assembly after the device has been transitioned to the closed configuration, said switch assembly including a switch on the interior surface of said upper casing and an actuator on an interior surface of said lower casing, said switch being configured for engaging said actuator when said upper and lower casings are squeezed together at their respective exterior surfaces at said switch assembly;
as a result of said squeezing, activating said display;
after said external display is activated, squeezing said upper and lower casings together at their respective exterior surfaces at the switch assembly to navigate through the plurality of applications on said display when the device is in the closed configuration;
as a result of said squeezing, cycling through each of the plurality of applications visible on said display, wherein each successive squeezing of the upper and lower casings at their respective exterior surfaces at the switch assembly results in a different application of the plurality of applications to be displayed;

selecting one of said plurality of applications by engaging a navigation button provided on the exterior surface of said upper casing.

18. The method of claim 17 further including the steps of:

cycling through said selected application by squeezing said upper and lower casings together at said switch assembly; and selecting within said selected application by engaging said navigation button.

19. The method of claim 17 further including deactivating said switch and said actuator when the device is in an open configuration.

20. The method of claim 17 wherein when said upper and lower casings are squeezed together at said switch assembly such that said switch and said actuator are engaged for a predetermined amount of time, the device is locked.

* * * * *